United States Patent
Holman

(10) Patent No.: US 11,336,772 B1
(45) Date of Patent: May 17, 2022

(54) LIMITED DEROGATION OF CONTACT CENTER AGENT SKILL LEVELS

(71) Applicant: Noble Systems Corporation, Atlanta, GA (US)

(72) Inventor: Richard Holman, Cumming, GA (US)

(73) Assignee: Noble Systems Corporation, Atlanta, GA (US)

(*) Notice: Subject to any disclaimer, the term of this patent is extended or adjusted under 35 U.S.C. 154(b) by 0 days.

(21) Appl. No.: 16/787,872

(22) Filed: Feb. 11, 2020

(51) Int. Cl.
*H04M 3/523* (2006.01)

(52) U.S. Cl.
CPC ....... *H04M 3/5233* (2013.01); *H04M 3/5235* (2013.01); *H04M 3/5238* (2013.01)

(58) Field of Classification Search
None
See application file for complete search history.

(56) References Cited

U.S. PATENT DOCUMENTS

| | | | | |
|---|---|---|---|---|
| 5,903,641 | A * | 5/1999 | Tonisson | H04M 3/5233 379/265.12 |
| 6,704,410 | B1 * | 3/2004 | McFarlane | H04M 3/5233 379/265.05 |
| 2012/0278136 | A1 * | 11/2012 | Flockhart | G06Q 10/063112 705/7.38 |
| 2012/0316907 | A1 * | 12/2012 | Nimmagadda | G06Q 10/0631 705/7.14 |
| 2013/0022194 | A1 * | 1/2013 | Flockhart | H04M 3/5233 379/265.06 |

* cited by examiner

*Primary Examiner* — Nafiz E Hoque
(74) *Attorney, Agent, or Firm* — Blank Rome LLP

(57) ABSTRACT

A call handler in a contact center is configured to temporarily derogate the skill level of one or more agents in a group having a common skill. During the time period of derogation, incoming calls will be routed to agents with the highest skill level, such that the normally lower skill level agents will be selected to receive calls. If there are more than one agent meeting this criteria, then the agent that has been waiting the longest to receive a call is selected. This allows the lower skill level agents to gain experience in handling calls and improving their call handling capabilities. After a set threshold, the derogation of the agents is terminated, and their skill level is restored to the pre-derogation level. In this manner the lower skill level agents are given limited opportunities for improvement by handling calls.

17 Claims, 4 Drawing Sheets

LIMITED DEROGATION OF CONTACT CENTER AGENT SKILL LEVELS

BACKGROUND

Contact centers route incoming calls to agents based on various criteria. Frequently, calls that are directed to a common telephone number, such as toll-free number, are serviced by a pool of agents. Thus, multiple incoming calls are answered and routed to an available agent. There are various algorithms known in the art for how incoming calls can be routed to an available agent in the pool. Essentially, the phrase "routing the call" means that an agent has been selected to receive the call, and hence the former function implies the latter function with respect to receiving the call.

Some routing algorithms may attempt to equitably distribute the call to the group of available agents. One approach may involve 'round-robin' list approach where all agents are selecting before repeating an agent. In other approaches, an algorithm that equitably distributes calls to agents is not suitable. For example, consider a pool of agents handling incoming customer service calls. It is common that in many applications, there may be a set of agents that is able to handle Spanish-speaking callers, while other agents in the pool can only handle English-speaking callers. Equitably distributing calls to agents among both these groups may not be suitable if a caller is only able to communicate in one language (Spanish) and the selected agent is not able to converse in Spanish. Similarly, in the customer service context, certain agents may be trained to handle establishment of a new service for the customer, whereas other agents may be trained to handle disconnection of service for customers or bill payment issues.

Thus, agents may be assigned a skill reflecting the types of calls that they can handle. Agents having the skill of being bi-lingual may receive either Spanish-speaking callers or English-speaking callers. In contrast, those agents having an English-only skill, may only receive calls from English-speaking callers.

In addition, it is known that agents with a specific skill may have different levels of proficiency within that skill (i.e., a "skill level"). An agent that is bi-lingual may be proficient in two languages, or marginal with respect to a second language. It may be desirable to first route calls to the available agents with the higher proficiency level first and on the agents with a lower skill level only when the volume of calls dictates (i.e., the high skill level agents are busy, and hence unavailable). However, doing so results in an obvious outcome. Those agents with the high skill level are more likely to receive calls than those agents with a lower skill level. That means the lower skill level agents receive fewer calls and have corresponding fewer opportunities to handle calls relative to the higher skill agents. For agents that, for example, receive a commission for a sale, handling more calls means more opportunities for receiving a commission. Similarly, for agents that receive fewer calls, there is less of an opportunity for receiving a commission. Further, receiving fewer calls may means that the agents with a lower skill level have less opportunities to improve. This can lead to various problems, such as agent attrition, poor morale, lack of opportunities for improvement, etc. This may lead to increase costs for the contact center operator, since replacing an agent has an associated quantifiable cost for identifying, interviewing, hiring, and training. Failing to provide suitable opportunities for the lower skill level agents to improve means that those agents may remain at a lower skill level longer. Thus, approaches for improving agents and reducing attrition provides significant practical benefits to a contact center operator.

Therefore, mechanisms are needed to modify how call routing operates, taking into account the skill level of agents, so as to achieve equitable opportunities among agents with different skill levels.

BRIEF SUMMARY

In general, embodiments of the present invention provide computer-program products, methods, systems, apparatus, and computing entities for routing calls to contact center agents based on dynamically modifying the skill level associated with agents in a pool, so as to ensure some form of equitable opportunities for lesser skilled agents. Specifically, the skill level of certain agents are derogated (i.e., lowered) and then subsequently restored.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
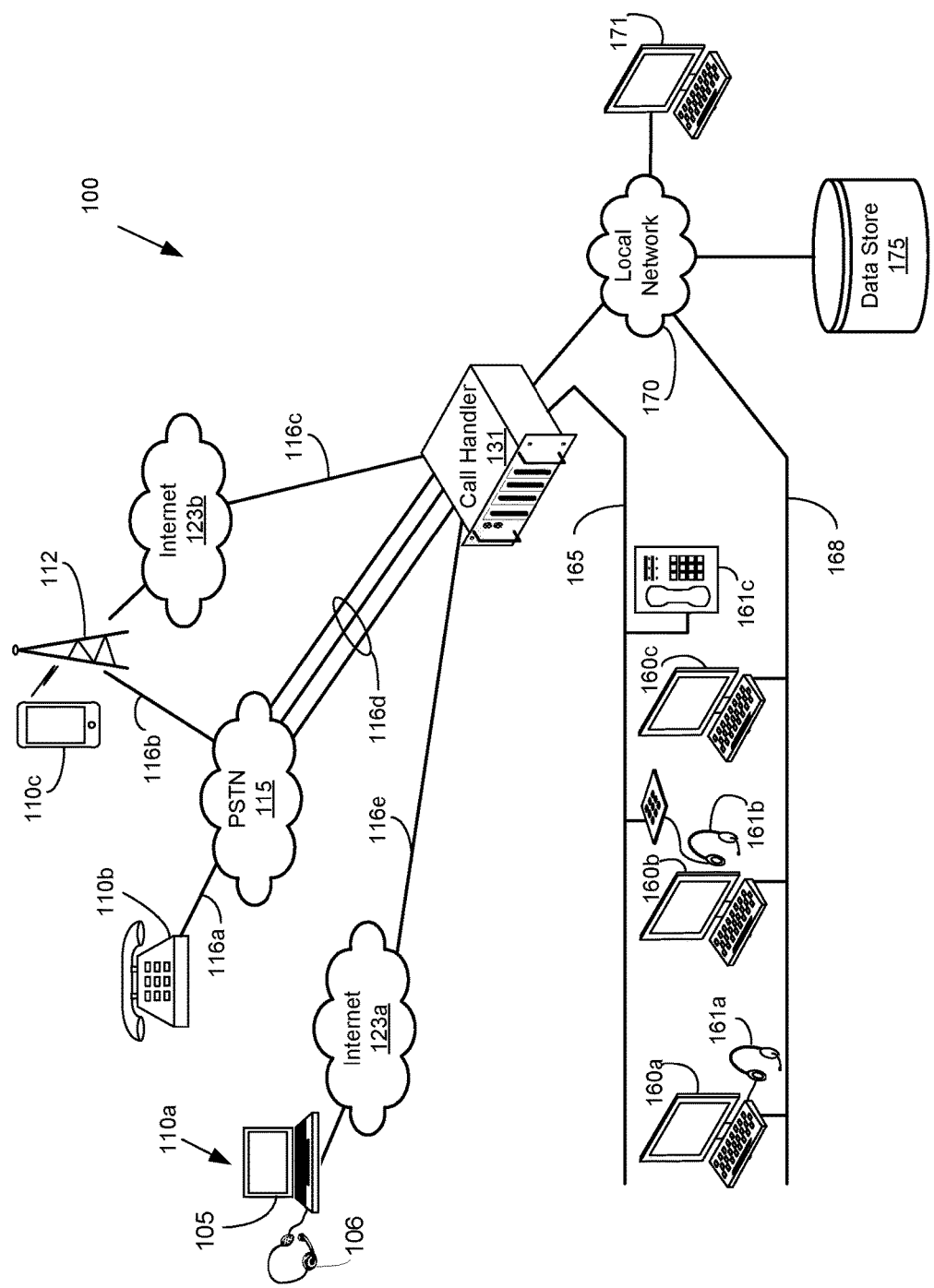
FIG. 1 illustrates one environment in which the concepts and technologies herein may be embodied.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. The claim language should not be construed as being written in a "means-plus-function" form unless expressly indicated via the recitation of the phrase "means for . . . " in the claims. Like numbers in the drawings refer to like elements throughout.

Exemplary Contact Center Architecture

FIG. 1 shows one embodiment of a contact center architecture 100 illustrating the various technologies disclosed herein. The contact center shown in FIG. 1 may process voice calls that are inbound-only, outbound-only, or a combination of both (sometimes referred to as a "blended" contact center). Thus, in some instances, the contact center may be referred to as a call center when referring primarily to the context of handling voice type calls. Although many aspects of contact center operation are disclosed in the context of voice calls, in various embodiments, the contact center may process other forms of communication such as, for example, facsimiles, emails, text messages, video calls, and chat messages. The concepts disclosed herein can apply to these other forms of communication routed by a contact center.

Since the contact center may handle calls originating from a calling party, or initiated to a called party, the term "party" or "remote party" without any further qualification, refers to a person associated with a call processed by the contact center, where the call is either received from or placed to the party. The term "caller," if used, will generally refer to a party communicating with the contact center, but in many cases this usage is exemplary. Thus, use of the term "caller" is not intended to limit the concepts to only inbound calls or voice calls, unless the context dictates such. For example, when referring to an inbound call to the contact center, the term "caller" refers to the person calling the contact center.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, VoIP networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology. Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a headset 106. The computing device 105 may in turn be connected to an Internet 123a. Those skilled in the art will recognize that a variety of protocols and facilities may be used to convey voice calls.

In various embodiments, inbound calls from callers to the contact center may be received at communications handler, and more specifically a call handler 131, which is a computer-based processing system configured to process voice calls, such as SIP (session initiated protocol), VoIP (voice over Internet Protocol), or TDM (time division multiplexing) technology based voice calls. The call handler could be, e.g., an automatic call distributor ("ACD"). In particular embodiments, the call handler 131 may be a specialized switch for receiving and routing inbound calls under various conditions. The call handler 131 may route an incoming call over contact center facilities 165 to an available agent. The call handler may deploy various algorithms, including the ones disclosed herein, for selecting an agent to receive an incoming call. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the call handler 131.

In various embodiments, calls may be routed over facilities 165 to an agent for servicing. That is, for example, the party may speak with an agent to receive customer service. An agent typically uses a computing device 160a-160c, such as a personal computer, and a voice device 161a-161c. The combination of computing device 160a-160c and voice device 161a-161c may be referred to as a "workstation." In many instances, the computing device handles VoIP so that reference to the "computer workstation" or the "agent's computer" refers to the computer processing device of the workstation, but which may be closely integrated with handling voice as well. Thus, for these particular embodiments, the workstation can be assumed to have at least a data capability and may have a voice capability. Depending on the embodiment, the interaction between the call handler 131 and the agent workstation computers 160a-160c, as well as other components, may involve using a local area network ("LAN") 170.

In addition to receiving inbound communications, including, for example, voice calls, emails, text messages, and facsimiles, the contact center may also originate communications to a called party, referred to herein as "outbound" communications. In some embodiments, the call handler 131 may comprise a dialer, such as a predictive dialer, to originate outbound calls at a rate designed to meet various criteria. In various embodiments, the call handler 131 is typically configured to dial a list of telephone numbers to initiate outbound calls. Data for the calls may be stored in a data store 175. The data store 175 may also store data used by the call handler for routing calls. For example, the call handler 131 may load skill and skill level data for each agent from the data store 175 upon an agent logging into the call handler.

An administrator using the administrator workstation 171 may interact with the call handler to configure the process, and to define various parameters associated with routing calls to an agent. As shown in FIG. 1, the administrator's computer 171, may communicate via the LAN 170 to the call handler and the data store.

Although a number of the above entities may be referred to as a "component," each may be also referred to in the art as a "computing device," "unit" or "system." A server may incorporate a local data store and/or interface with an external data store. Use of the word "server" does not necessarily require the component to interact in a client-server arrangement with other components, although that may be the case. Further, the above components may be located remotely from (or co-located/integrated with) other components. Furthermore, one or more of the components may be implemented on a single processing device to perform the functions described herein. In addition, the contact center architecture 100 may be provided as a hosted solution, where the call processing functionality is provided as a communication service (a so-called "communication-as-a-service" or "CaaS") to a contact center operator. Thus, there is no requirement that the components identified above must be physically located in a contact center location or controlled by a contact center operator. In addition, depending on the embodiment, the agent positions may be remotely located from the other components of the contact center, sometimes referred to as a "virtual contact center." Those skilled in art will recognize FIG. 1 represents one possible configuration of a contact center architecture 100, and variations are possible with respect to the protocols, facilities, components, technologies, and equipment used.

High Level Service Description

The Skill Level Derogation ("SKILD") feature allows agents with a lower skill level to temporarily handle more calls than they otherwise would compared to following conventional call routing procedures. SKILD allows an administrator to set the feature to operate when desired, thereby allowing lower skilled agents to receive more calls than normal for a temporary time period. The motivation for enabling the feature may be varied. For example, enabling the SKILD feature could be viewed as providing a test of the lower-skilled agents' abilities to handle more calls. Or, it could be viewed as a method for providing more experience or training opportunities for lower skilled agents, or offering these agent greater sales opportunities associated with handling more calls.

The SKILD feature can be activated based on various criteria, which includes activating the feature for a set of agents for a limited time basis or for a certain number calls. For example, the time basis could be based on activating the feature for a portion of a work shift on a given day, or for a defined number of hours or a percentage of the time during a shift. If activated after a certain number of calls, then the activation could be based on an aggregate number of calls that the lower or higher skilled agents have handled, or based on reaching a percentage threshold of calls, either for a specific agent basis or a group agent basis. These options could be activated based on a schedule or other criteria. Those skilled in the art will recognize that a wide variety of criteria could be defined for how and when the SKILD feature would be activated.

Conventional call routing algorithms typically define a pool of agents that can receive calls based on a static set of conditions. Similarly, the SKILD feature involves defining a group of agents. The agents in the group will all have at least one skill level. This may be a default skill level, which is not then necessarily stored as a skill level. For example, all agents may be able to handle incoming customer service calls, where the caller is speaking in English. Optionally, some of those agents may have another skill level, such as handling Spanish speaking callers (or some other language). Thus, agents may have a bi-lingual skill and presumed to have an English skill, or each agent may be presumed to have an English skill and optionally a Spanish language skill. The concepts disclosed herein may apply to agents, regardless of whether they have a single skill level or multiple skills.

In addition, for each skill associated with an agent, there is a corresponding skill level associated with the agent. The skill level indicates a level of proficiency of the agent for that skill. For example, an agent with a Spanish skill level may be proficient at speaking and understanding, but not writing Spanish. Another agent with a Spanish skill level may be barely able to speak Spanish, but can readily understand it. Thus, the skill level is a way to indicate a relative level of proficiency. In various embodiments, a numerical value can be used to indicate the skill level. For purposes of illustration herein, a skill level between 1-9 is defined, with 1 being the lowest level and 9 the highest level. In some embodiments, a level of 0 could be defined as the lowest skill level, or the value could be viewed alternatively as not having the skill.

When an agent is handling a call, the agent's status is usually marked as unavailable. It is presumed for purposes of illustration, that an agent is able to handle only one call at a time, and thus is unavailable while on a call, and may be considered available after the call is completed. There may be other agent work states defined, such as an "after-call work" state, pause state, etc. However, those skilled in the art will recognize that an agent that is unavailable for receiving a call, regardless of what state they are in, if the agent is cannot be considered for receiving that call.

An incoming call will be routed to one of the available agents having the required skill. In various embodiments, the agent will be required to meet the required skill criteria. Assuming that the agents in the pool all have the same required skill, then the next decision is to ascertain which of the available agents should be selected, given that they may have different skill levels.

For purposes of illustration, in one embodiment the agent having the highest skill level is selected. Because it is likely there may be more than one agent with the same skill level, the agent waiting the longest is selected and connected to the incoming call. Stated otherwise, the longest waiting agent with the highest skill level has priority for call routing purposes. Under this algorithm, all available agents at the highest skill level will be selected for handing an incoming call before the call is routed to an available agent at a lower skill level. To illustrate, assume there are 30 available agents sharing a common skill, but with various skill levels. First, all agents with a skill level of 9 will be connected to incoming calls. Once all of these agents are unavailable, then all agents with the next lower skill level, 8, will be connected to incoming calls. And so forth.

As can be expected, the process continues and will select lower skill level agents. until However, if during the time an incoming call is being processed, an agent with a skill level of 9 completes the call and becomes available, then that agent with the skill level of 9 will take priority over selection of the agent with a skill level of 2. This approach means that all of the higher-skilled agents must be occupied on a call before the agent with a lower skill level can receive the call. If there are relatively few agents in the group of 30 agents with a level of 1 or 2, then those relatively lower skilled agents will be among the last agents selected for receiving a call.

Such treatment means the lower skilled agents may not receive many incoming calls. Such agents will have few opportunities to improve their skills, or practice newly acquired training information. Thus, it may be desirable to increase the number of calls handled by the lower skilled agent to provide them more experience, to coach them on how to better handle calls, and to provide them equitable access to sales opportunities.

One approach for doing so involves reducing or derogating the skill level of the higher-skilled agents. By temporarily reducing the skill level of the higher rated agents, more calls will be offered to the lower skilled agents. The reduction of the skill level could be static or dynamically determined. For example, in one simple example, the skill level of higher-rated agents could be reduced by five. Thus, an agent with a 8 skill level rating could be reduced to a 3 rating. Similarly, an agent with a 9 rating could be reduced to 4 rating. An agent with a 5 rating could be reduced to 0. In other embodiments, the lowest level that an agent could be derogated to is 1 or 0 (i.e., to avoid a negative value). By reducing the opportunities for higher rated agents to receive calls, the lower rated skill level agents will receive more calls.

The above approach reduces the number of calls that higher level skilled agents receive and increases the number of calls offered to lower skilled agents (provided, the higher skilled agents are sufficiently derogated to be at a lower skill level). An alternative approach could involve increasing the skill level of the lower skilled agents, but doing so could merely put them on par with the higher skilled agents and may not necessarily result in routing as many calls to the normally lower skilled agents. Of course, if the lower skilled agents are raised to a skill level above the higher skilled level agents, then they would likely receive more calls.

The routing of calls based on a derogated skill level must be preceded by two prior events. First, the SKILD feature must be activated and second, after it is activated, the skill level of an agent must be derogated. Activation of the feature involves the feature monitoring conditions for then derogating the skill level. Determining when to lower the skill level is referred to as "skill level derogation triggering", "derogation triggering" or simply "triggering." Similarly, if the skill level is restored to its original value, this process is referred to as "skill level restoration" or "restoring the skill level."

The activation of the SKILD feature can be scheduled to occur on a given day and a specified time. It can be defined to start at a specified time for a specified duration. Alternatively, it can be defined to occur for a percentage of time in a shift or for the entire shift. The SKILD feature can also be activated based on the occurrence of certain criteria. For example, if a certain agent population (i.e., the group of lower skill level agents) has been idle longer than a threshold (on the average), then it may be desirable to activate the feature so that calls will be routed to the lesser skilled agents. Alternatively, a supervisor or administrator may be prompted about the detection of the criteria and then manually activate the feature. Thus, activation may occur manually as well.

In some embodiments, triggering the skill level derogation may occur immediately after activation of the SKILD feature. However, doing so immediately may disadvantage the higher level skilled agent with respect to reaching a daily quota. Thus, it may be desirable to allow the agent to reach their quota first before reducing the number of calls that would otherwise be offered to that agent. Thus, in many embodiments, a separate criteria is defined that triggers the derogation. In one embodiment, the triggering for a high skill level agent occurs after that agent has handled a defined number of calls (either by reaching an absolute value or a percentage of the number of expected calls to be handled) or after a time period (either after passage of an absolute time period or passage of a percentage of their shift). Thus, for example, a highly skilled agent may have their skill level reduced after handling 50 calls, handling 50% of their expected calls for the day, after 5 hours of call handling, or after 50% of their scheduled shift has passed.

The SKILD service maintains data regarding the level of derogation. It could be defined as an absolute drop in skill level (e.g., a drop of 5 levels from their current level) or it could be defined as dropping to a defined level (e.g., drop to level 1). By dropping the skill level of a higher skilled agent, their relative standing to other lower-skilled agents is reduced. The regular skill level is referred to herein as the "default" skill level, and the temporary lower level is referred to as their "derogated skill level." Thus, the derogated agents have dynamic skill levels during their working shift. The skill levels of the lower skilled agents are not altered, and hence their skill levels are static.

A simple example illustrates how the lower skilled level agent would receive calls otherwise not received. Consider the impact of a pool with just two agents, Agent A with a high skill level and Agent B with a low skill level. If Agent A is available, then every incoming call will be routed to Agent A. Only if there is another incoming call while Agent A is unavailable, will that call be routed to Agent B. At some point during Agent A's shift, the derogation of Agent A's skill level may be triggered. For the agent selection to be impacted, the derogation would have to result in Agent A's skill level reduced to below Agent B's skill level. Now, any incoming call would be routed to Agent B, if they are available. This would increase the opportunities for Agent B to field incoming calls. Of course, if there is another incoming call while Agent B is unavailable, then Agent A would be selected.

If there are multiple agents with the same skill level that are eligible to receive an incoming call, then the agent waiting the longest would be selected. Other criteria could be used, such as selecting the agent among multiple available agents, such as the agent with the fewest calls, lowest performance rating, shortest tenure, etc.

Process Flows

Figure 2:
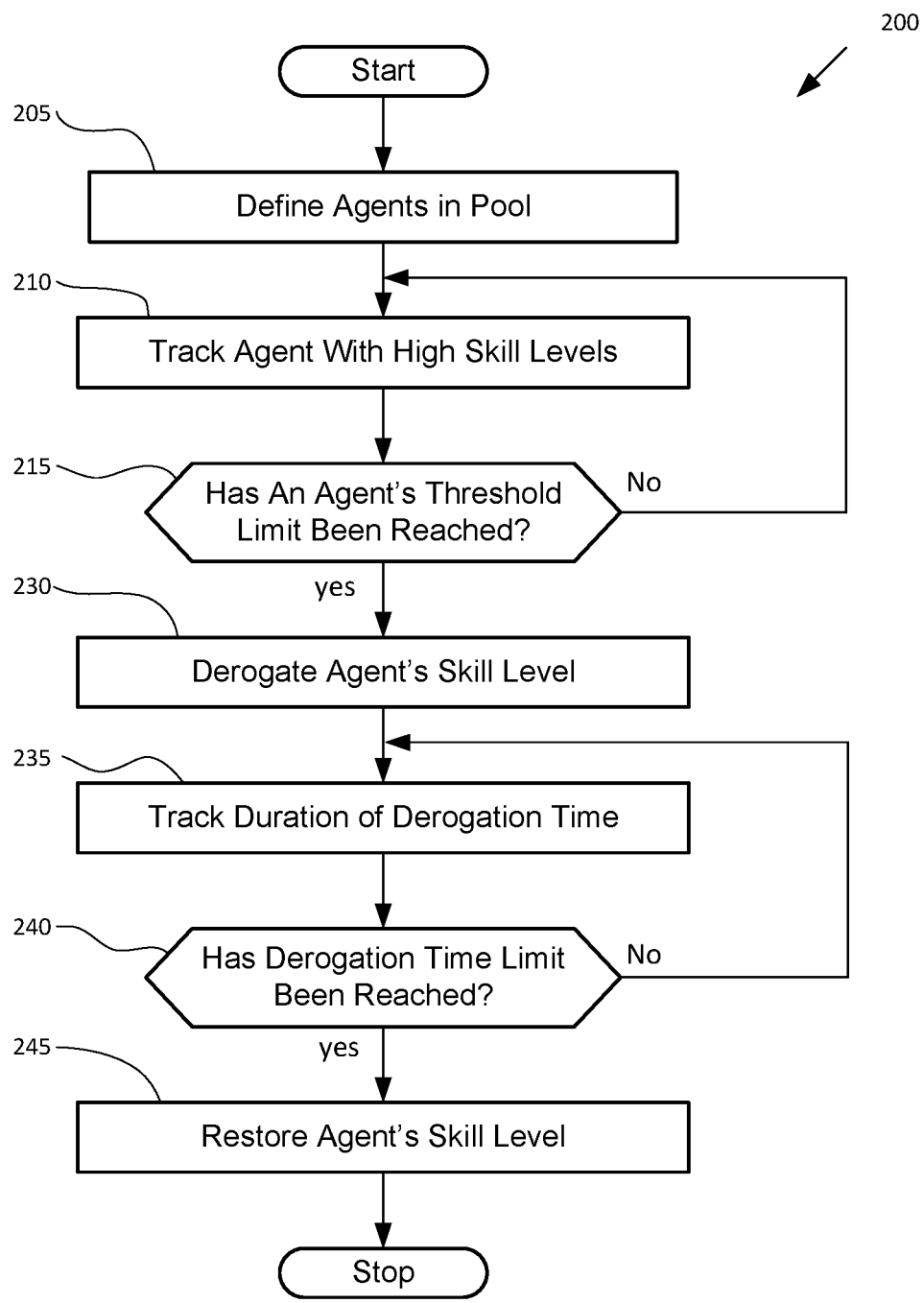
FIG. 2 illustrates one embodiment of a process flow at a high level for derogating the skill level of an agent.

One embodiment of the process for derogating the skill level of an agent is shown in FIG. 2. The process 200 typically requires that a plurality of agents are first associated in a group of some form in operation 205. This group is referred to herein as a "pool." These may be agents selected to handle any incoming call, incoming calls of a certain type, outgoing calls, or calls addressing a particular business process (e.g., billing questions). The concepts herein are typically practiced when the group comprises several agents (or more).

The agents in the pool share a skill, such that they are all able to handle calls requiring that skill. While it is possible for agents to be assigned multiple skills, the concepts described herein apply to a particular skill. Further, each agent in the pool is assigned a skill level for that skill, indicating their level of proficiency. For sake of illustration, the skill level may be from 0-9 or 1-9, with the highest number indicating the highest level of proficiency.

After the appropriate groups, skills, and skill levels are assigned, the agents in the pool receive incoming calls according to existing algorithms. Each agent in the pool may have their status tracked. The process 200 pertains to the operations for derogating a particular given agent, so it should be recognized that the process 200 can apply to any agent in the pool.

Each agent is tracked in operation 210 in some manner to ascertain when it is appropriate to derogate the agent's skill level. The tracking may focus on the number of calls an agent has handled, the number of sales achieved by the agent, or some other performance metric. In some embodiments, the triggering event for derogating the agent's skill level is not based on call handling events associated with that agent, but some other criteria, such as the passage of time from the beginning of the agent's shift, or a percentage of the agent's shift. For example, an agent's derogation may be triggered several hours after their shift begins, or several hours before their shift ends. In another embodiment, the derogation may reach a threshold caused by a certain percentage of the agent's shift having passed (e.g., 30% of the shift has been completed). Those skilled in the art will be able to identify other criteria used as a threshold for triggering the derogation of the skill level. Regardless of how this criteria is defined, it is tracked in operation 210.

A test of the threshold is performed in operation 215. If the threshold has not been reached, then the process returns to operation 210 where the criteria continues to be monitored for that agent. Once the threshold has been reached in operation 215, the agent's skill level is derogated in operation 230. The derogation may occur based on a fixed level decrement. For example, the skill level may be lowered to a value of 1 or may be reduced by a fixed integer value. For example, a highly skilled agent with a skill level of 8 could be derogated by a value of 5 to a temporary skill level of 3. Or, in other embodiments, the skill level could be reduced by a percentage (e.g., reduced by 66%). The algorithms may round the calculated skill level value and/or ensure that no negative value is returned. In other embodiments, other algorithms could be used to derogate the skill level.

Once the value is derogated in operation 230, the time of the derogation is tracked in operation 235. In one embodiment, the derogation of the skill level may remain at that level for that agent for the remainder of the shift. In another embodiment, the derogation may exist for a specific number of calls or call outcomes. These calls may be measured for the derogated agent or for the lower-skill level agents that are now receiving calls. Thus, the high-level skilled agent with the derogated skill level may be in the derogated state for a fixed number of calls. Or, the agent may be derogated for a certain time period. Thus, the agent could remain derogated for 10% of their allocated shift, for 10 minutes, or for 10 calls. Those skilled in the art will recognize that various criteria could be used to restore the derogated agent back to their default skill level, and that the criteria used to derogate the agent's skill level does not necessarily have to be the same criteria for restoring the agent's skill level.

If the time limit in operation 240 is not reached, then it is monitored by returning to operation 235. If the time limit is reached in operation 240, then the process continues to operation 245 where the agent's skill level is restored to its pre-derogated (or default) level.

It is during this time period when the skill level is derogated that the derogated agent is expected to receive fewer calls, and the other lower skilled level agents (non-derogated) are expected to be receiving more calls. The process employed by the call handler in routing calls to the derogated and non-derogated agents is shown in FIG. 3 below.

Figure 3:
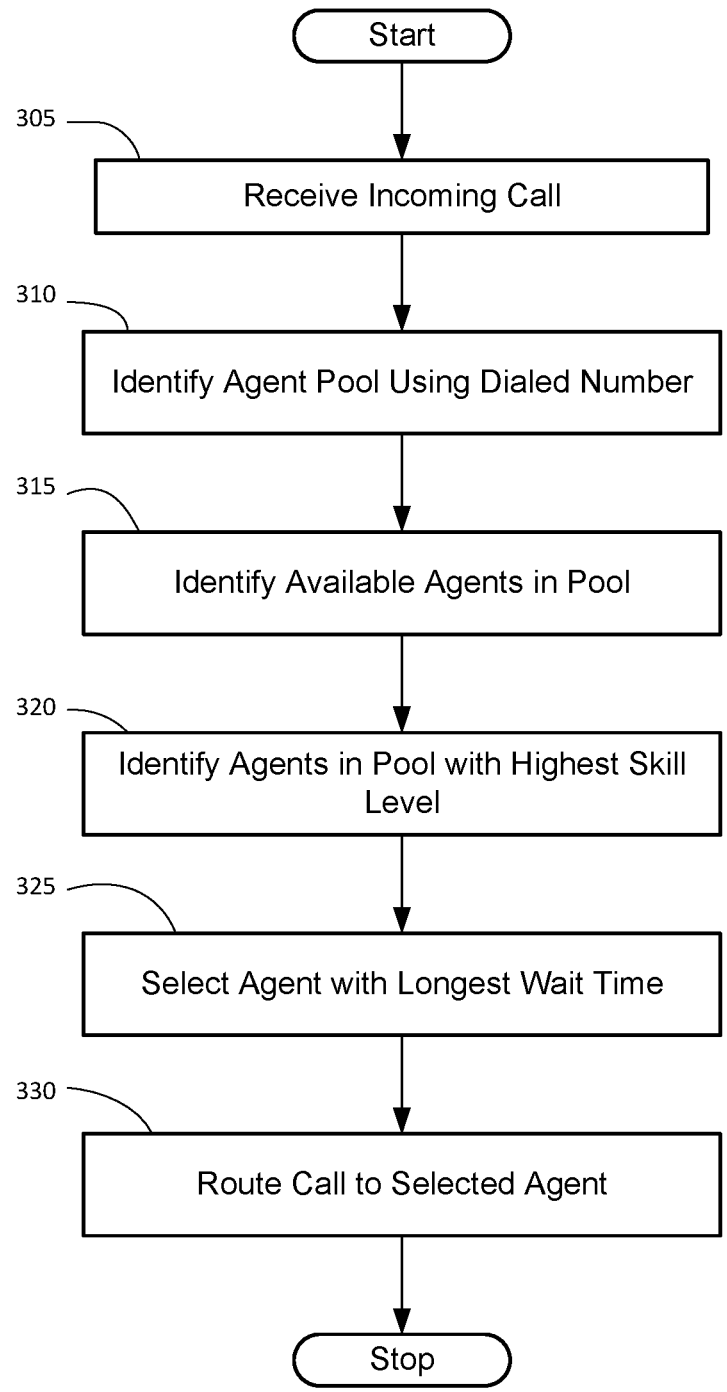
FIG. 3 illustrates one embodiment of a call handler selecting an agent for handling the incoming call.

The process in FIG. 3 begins with the call handler receiving a call in operation 305. The call indicates a dialed number, and that is typically used to identify a purpose (and necessary skill) of the call, by mapping the dialed number to the agent pool in operation 310. At this point, the call handler knows the population of agents which potentially could handle the call. Thus, the skill necessary to handle the call is known.

The next operation is to determine from the pool of available agents, which agents are available to accept the call. The call handler maintains status information of each agent in the pool with respect to whether they are on a call or are waiting for a call. The call handler identifies the agents that are available in operation 315.

Next, the call handler determines from among the available agents in the pool which have the highest skill level. The call handler may not necessary have determined which agents have been derogated or not. Rather, an external entity has reassigned the skill level of the agent in the call handler and the call handler simply selects the agent with the highest skill. For the high skill level agents which are not derogated, their skill level will be the higher than the lower skill level agents. However, when the high skill level agents are derogated, their skill level will likely be below some of the lower skill agents. Thus, the call handler selects the agent(s) with the highest skill level in operation 320.

If there is only one agent with the highest skill level, then the call is routed to that agent. More likely, there will be multiple agents having the same skill level, so that a means for selecting one among the subset must be defined. Those skilled in the art could adapt a number of queuing algorithms for determining which agent should be selected. In one embodiment, the agent with the longest waiting time is selected in operation 325. That is, the agent with the longest time since last handling a call is selected. In other embodiments, the agents could be selected using e.g., a round-robin algorithm or selecting the agent by tenure. Once the agent is selected, then the call is routed to the agent in operation 330.

Thus, the call handler can merely employ an existing algorithm for selecting an available agent from a pool, wherein the agent has the highest skill level, and has the longest waiting time. In this manner, a single agent is selected. If the highly skill level agents are derogated, then the lower skilled agents will receive calls. Once the derogated agents are restored to their original skill level, then these higher skill level agents will have priority with respect to receiving calls compared to the lower skill level agents.

Exemplary Computer Processing System

Figure 4:
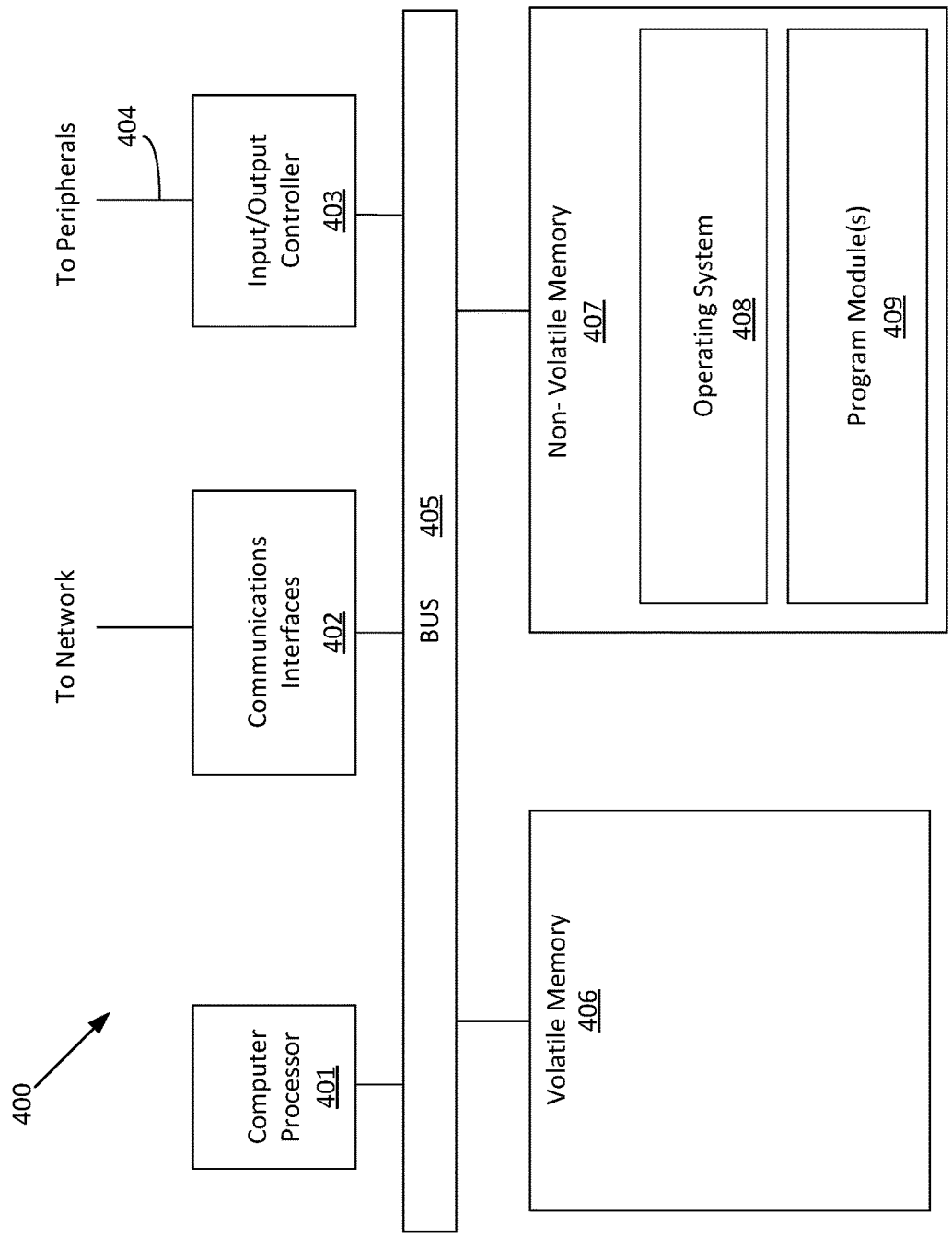
FIG. 4 illustrates an embodiment of a computer processing device for practicing various technologies and concepts disclosed herein.

As discussed in conjunction with FIG. 1, the contact center architecture 100 may comprise various components. Accordingly, FIG. 4 is an exemplary schematic diagram of a computer processing component 400 that may be used in various embodiments of the contact center architecture 100 to practice the technologies disclosed herein such as, for example, the communications handler 131. In general, the term "computer processing component" may be exemplified by, for example, but without limitation: a various types of computers, servers, blades, gateways, switches, and the like, as well as any combination of devices or entities adapted to perform the functions described herein.

As shown in FIG. 4, the computer processing component 400 may include one or more computer processors 401 that may communicate with other elements within the computer processing component 400 via a bus 405. The computer processor 401 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the computer processing component 401 may also include one or more communication interfaces 402 for communicating data via the local network with various external devices, such as other components shown in FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The computer processing component 401 may further include an input/output controller 403 that may communicate with one or more input devices or peripherals using an interface 404, such as, but not limited to: a keyboard, a mouse, a touch screen/display input, microphone, pointing device, etc. The input/output controller 403 may also communicate with output devices or peripherals, such as displays, printers, speakers, headsets, banner displays, etc.

The computer processor 401 may be configured to execute instructions stored in volatile memory 406, non-volatile memory 407, or other forms of computer-readable storage media accessible to the processor 401. The volatile memory 406 may comprise various types of memory technologies, including, but not limited to: random access memory ("RAM"), dynamic random access memory ("DRAM"), static random access memory ("SRAM"), and other forms well known to those skilled in the art. The non-volatile memory 407 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 407 may store program code and data, which also may be loaded into the volatile memory 406 at execution time. Specifically, the non-volatile memory 407 may store one or more program modules 409, containing instructions for performing the processes and/or functions associated with the technologies disclosed herein, and/or operating system code 408. In addition, these program modules 409 may also access, generate, or store data 410, in the non-volatile memory 407, as well as in the volatile memory 406. The volatile memory 406 and/or non-volatile memory 407 may be used to store other information including, but not limited to: records, applications, programs, scripts, source code, object code, byte code, compiled code, interpreted code, machine code, executable instructions, or the like. These may be executed or processed by, for example, the computer processor 401 and/or may form a part of, or may interact with, the program modules 409.

The technologies described herein may be implemented in various ways, including as computer program products comprising memory storing instructions causing a computer processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A call handler in a contact center configured to route an incoming call:
   maintain a skill level for each agent in a group of agents, wherein the skill level is used in call routing, and wherein a first agent has a first skill level that is higher than a second skill level of a second agent;
   determine the first agent has met a derogation threshold;
   derogate, in response to the first agent meeting the derogation threshold, the first skill level to obtain a derogated first skill level, wherein the derogated first skill level is lower than the second skill level;
   receive an incoming call;
   determine the first agent and the second agent are available;
   route the incoming call to the second agent based on the second skill level being higher than the derogated first skill level;
   determine the second agent has met a restoration threshold; and
   restore, in response to the second agent meeting the restoration threshold, the first skill level of the first agent.

2. The call handler of claim 1, wherein the derogation threshold is based on a number of prior incoming calls routed to the first agent since a point in time.

3. The call handler of claim 1, wherein the derogation threshold is a time determined from a beginning of a shift of the first agent.

4. The call handler of claim 1, wherein the restoration threshold is met by the second agent handling a defined number of calls.

5. The call handler of claim 1, wherein the derogated first skill level is based on reducing the first skill level by a first integer number.

6. The call handler of claim 1, wherein a third agent has the second skill level, and the incoming call is routed to the second agent over the third agent based on the second agent having a longer time period since handling a prior voice call compared to the third agent.

7. The call handler of claim 1, wherein the restoration threshold is met by the second agent handling a defined number of calls.

8. A method for routing voice calls to an agent in a contact center, comprising:
   defining a group of agents, wherein each agent in the group of agents has a skill;
   assigning a skill level to each agent in the group of agents, wherein a first agent has a first skill level that is higher than a second skill level of a second agent in the group of agents;
   determining the first agent has met a derogation threshold;
   derogating, in response to the first agent meeting the derogation threshold, the first skill level to obtain a derogated first skill level, wherein the derogated first skill level is lower than the second skill level;
   receiving an incoming call at a call handler;
   determining the first agent and the second agent are available;

routing, by the call handler, the incoming call to the second agent based on the second skill level being higher than the derogated first skill level;

determining the second agent has met a restoration threshold; and restoring, in response to the second agent meeting the restoration threshold, the first skill level of the first agent.

9. The method of claim 8, wherein the derogation threshold is based on a number of prior incoming calls routed to the first agent by the call handler since a point in time.

10. The method of claim 8, wherein the derogation threshold is a time determined from a beginning of a shift of the first agent.

11. The method of claim 8, wherein the derogated first skill level is based on reducing the first skill level by a first integer number.

12. The method of claim 11, wherein the first skill level is associated with a second integer number less than ten.

13. The method of claim 8, wherein a third agent has the second skill level, and the incoming call is routed to the second agent over the third agent based on the second agent having a longer time period since handling a prior voice call compared to the third agent.

14. A non-transitory computer readable medium storing instructions that when executed cause one or more computer processors to:

maintain a skill level for each agent in a group of agents, wherein the skill level is used in call routing, wherein a first agent has a first skill level that is higher than a second skill level of a second agent;

determine the first agent has met a derogation threshold;

derogate, in response to the first agent meeting the derogation threshold, the first skill level to obtain a derogated first skill level, wherein the derogated first skill level is a lower skill level than the second skill level;

receive an incoming call;

determine the first agent and the second agent are available;

route the incoming call to the second agent based on the second skill level being higher than the derogated first skill level;

determine the second agent has met a restoration threshold; and restore, in response to the second agent meeting the restoration threshold, the first skill level of the first agent.

15. The non-transitory computer readable medium of claim 14, wherein the derogation threshold is based on a number of prior incoming calls routed to the first agent since a point in time during a shift of the first agent.

16. The non-transitory computer readable medium of claim 14, wherein the derogation threshold is a time determined from a beginning of a shift of the first agent.

17. The non-transitory computer readable medium of claim of claim 14, wherein a third agent has the second skill level, and the non-transitory computer readable medium further comprises instructions causing the one or more computer processors to:

select the second agent to receive the incoming call over the third agent based on the second agent having a longer time period since handling a prior voice call compared to the third agent.

\* \* \* \* \*